April 4, 1939.  C. R. PATON  2,152,661
MOTOR VEHICLE
Filed Dec. 2, 1936  2 Sheets-Sheet 2
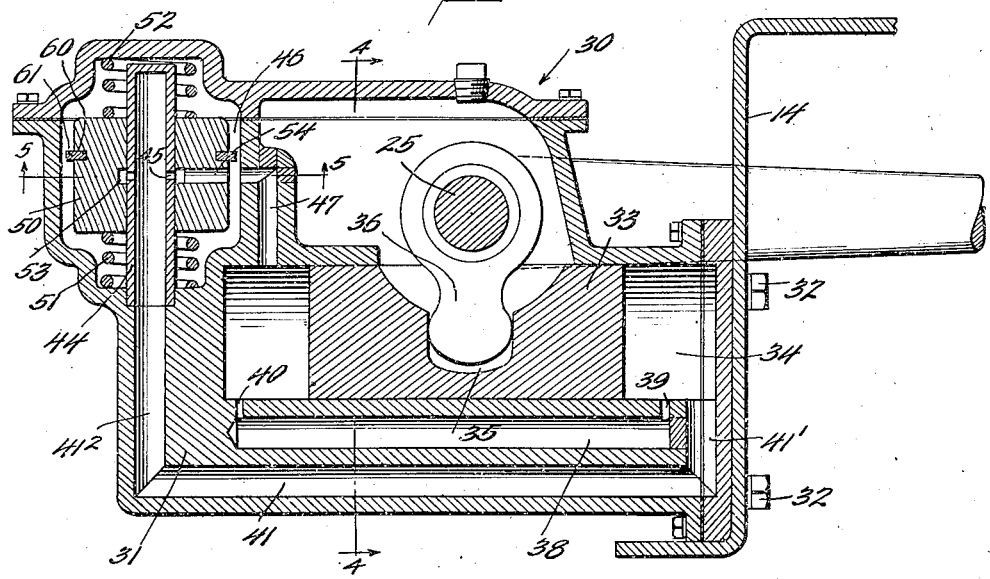

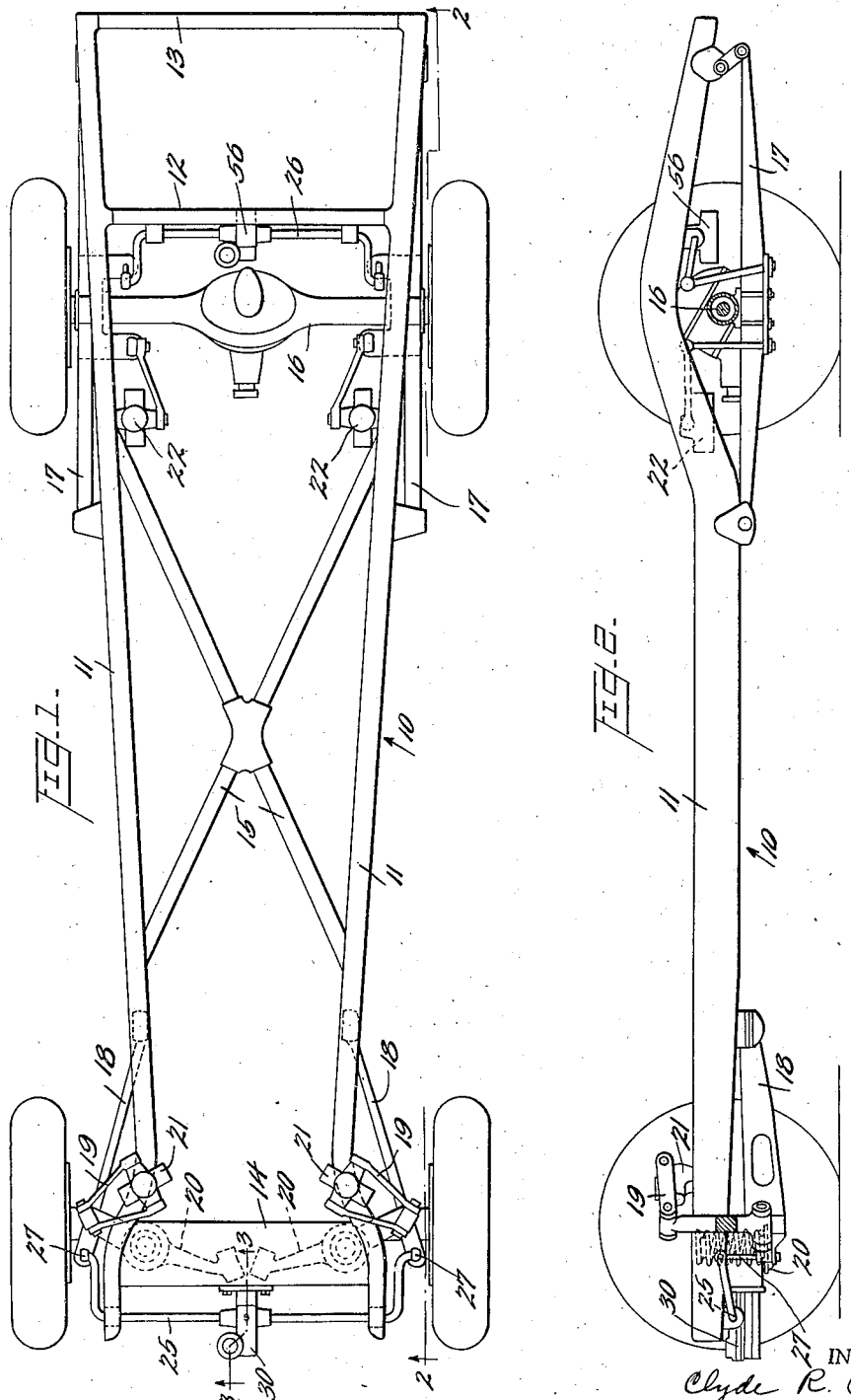

Patented Apr. 4, 1939

2,152,661

UNITED STATES PATENT OFFICE 2,152,661

MOTOR VEHICLE

Clyde R. Paton, Birmingham, Mich., assignor to Packard Motor Car Company, Detroit, Mich., a corporation of Michigan Application December 2, 1936, Serial No. 113,884

13 Claims. (Cl. 267—11)

The present invention relates to motor vehicles and particularly to novel and improved means for controlling or damping the vertical oscillations of a resiliently supported vehicle body or frame which result from passage of the vehicle wheels over roadway inequalities.

It is of course now conventional practice to provide shock absorbers of various types for the purpose of minimizing vehicle body movements, such shock absorbers being commonly interposed between the lower framework of the vehicle and the forward and rear axles thereof respectively, one such shock absorber being usually provided for each spring, and the several shock absorbers being individually operable so that each modifies the action of the spring with which it is associated. It has also been suggested that sidesway of a vehicle body may be substantially lessened by the utilization, in association with the suspension means for the rear of the vehicle body, of a transverse torsion rod or the like having its ends connected to the opposite ends of the adjacent rear axle by tie rods or links, and it has been proposed to damp rotatory movements of the torque rod by friction means. In the case of the ordinary shock absorbing means, however, and also in the case of the frictionally retarded sidesway damping device just above briefly described, the means for damping and opposing relative movements of the body and axle have been called into action by such relative movements.

The stabilizing mechanism contemplated by the present invention, on the other hand, is so designed and constructed, and so connected to the body and axles of the vehicle with which it is used, that it is substantially unresponsive to vertical movement of the vehicle axles, not modifying the action of the springs under ordinary circumstances and being called into operation only when the body of the vehicle itself tends to move bodily upward or downward with respect to its supporting axles. In other words, it is the object of the invention to provide means in association with a resiliently supported vehicle body which will detect sudden vertical movements of such body and will dampen or minimize such movements to promote the riding comfort of its occupants, such means being substantially ineffective to resist relative movement of the body and road wheels in the absence of vertical movement of the body in space, referred to hereinafter as absolute vertical movement. The improved stabilizing mechanism may advantageously be used in combination with or in addition to the conventional shock absorbing means now commonly employed. It will also be particularly useful when employed in combination with vehicle suspension means of the type disclosed in my copending application, Serial No. 702,615, filed December 15, 1933, in which a special form of spring suspension for motor vehicles is disclosed, this suspension embodying coiled compression springs, it being one object of the present invention to provide means which will advantageously cooperate with a spring suspension in which the road wheels are independently sprung from the vehicle frame, such as disclosed in the aforementioned application.

It has heretofore been generally the practice in motor vehicle manufacture to provide a rear suspension for the vehicle frame or body which includes two laterally spaced and longitudinally extending leaf springs, and to likewise support the forward end of the vehicle upon the forward axle through the intermediary of springs of this type. As the vehicle engine and other heavy parts of the driving mechanism have customarily been mounted upon the body at or toward the forward end thereof, it has been considered essential to provide and make use of supporting leaf springs at that end which are considerably stiffer than those employed to support the rear of the body upon the rear axle.

The use of such stiff springs has been deemed necessary because of the practical impossibility of designing a leaf spring of low natural frequency which is at the same time sufficiently strong to support a heavy load. By the use of coiled springs in the front end suspension mechanism it is possible to adequately support the heavier end of the body and at the same time bring the frequencies of the elastic systems at the front and rear of the vehicle more nearly into equality. As a result pitching, or fore and aft dipping, of the body, which was quite noticeable and objectionable when a vehicle equipped only with leaf springs passed over rough roadways, was materially reduced and body movements became principally movements of translation; the body remaining generally parallel to the plane of the road surface over which the vehicle was passing. Such movements, however, may at times become excessive, the body in effect bouncing vertically through such distances that the occupants are rendered uncomfortable; hence the importance of providing means for damping or substantially eliminating such excessive bouncing.

The present invention contemplates the utilization of a mechanism for this purpose which includes an element for detecting at its inception any sudden change of vertical positioning of the vehicle body and which means is so connected to a motion damping device of suitable character that such device is immediately called into action to modify the action of the spring suspension in such manner as to oppose further rapid movement of the body in the same direction and to thus minimize its vertical oscillation. Such mechanism is unaffected by vertical rising and falling movements of the axles and is only called into operation when the body itself tends to suddenly change its elevation.

The specific mechanism for detecting a sudden change of body elevation and modifying the action of the suspending springs may vary widely in its details but preferably includes a member carried by the body which is in the nature of a weight, yieldably supported by the body for movement in a direction normal to the plane of the lower frame of the body, which weight may be designated an inertia member which normally tends to remain at a fixed elevation as the vehicle moves horizontally so that, when the vehicle body is suddenly elevated, for instance, relative movement will occur between the inertia member and the body. The inertia member is so connected to a suitable form of spring oscillation damping means that this means is immediately called into action to modify the action of the spring suspension and the bouncing of the body kept within desired limits.

Preferably one such mechanism is placed at each end of the vehicle and I find it convenient to associate each such mechanism with a torsion rod for stabilizing the vehicle against sidesway since by the use of such rods the mechanism may more conveniently be mounted upon the vehicle and connected to the springs. This is especially true when the forward spring suspension is one which does not embody a continuous axle. The mechanism when so constructed is combined with the means for minimizing sidesway of the vehicle body, but will not interfere with the functioning of such means. By locating the inertia member near or on the longitudinal center line of the vehicle, the mechanism may be rendered much more responsive to body vertical displacement of the vehicle body as distinguished from lateral rocking movement thereof, movements of the latter type being more effectively resisted by the normal action of the conventional shock absorbers and by the torsion rod or other sidesway stabilizer.

In the accompanying drawings one form of the improved mechanism is illustrated, but it will be appreciated that this is set forth by way of example only and that, in adapting the same to motor vehicles of various types, the design and arrangement of the various elements thereof may be very considerably modified without failure to realize its advantageous results.

Figure 1 is a plan view of the lower frame of a motor vehicle body, showing also certain of the more essential parts of the front and rear suspensions;

Figure 2 is a vertical section taken on the line 2—2 of Figure 1;

Figure 3 is a section taken on line 3—3 of Figure 1;

Figure 4 is a section taken on line 4—4 of Figure 3; and

Figure 5 is a section taken on line 5—5 of Figure 3.

In the drawings only so much of a motor vehicle is illustrated as is necessary to show the essential features of the invention, the major portion of the body, the engine, and other parts being omitted. It will be understood, however, that the frame generally indicated at 10 is the underframe of the body and that, while it may be formed in various ways, it may advantageously be constructed as shown, having the longitudinally extending generally parallel side frame members 11, the rear cross frame members 12 and 13, and the forward cross frame member 14, as well as the diagonal braces 15. The rear axle is indicated at 16 and two substantially parallel longitudinally extending leaf springs, which may be of conventional type, at 17, these springs having their ends suitably connected to the side frame members 11 and the axle 16 being suitably attached to each spring intermediate the ends thereof. No novelty is claimed for this type of suspension.

At the forward end of the vehicle, however, a novel spring suspension of the type disclosed in my copending application, Serial No. 702,615, filed December 15, 1933, is illustrated in a rather diagrammatic manner. The details of this mechanism need not be described, but it is pointed out that this type of front end suspension includes no continuous axle extending from side to side of the vehicle, the front wheels being sprung entirely independently of each other by mechanism which includes the torque arms 18, the upper and lower wheel supporting links 19 and 20, and other elements, all fully described in my copending application, the resilient means employed in connection with each of these individual front wheel suspensions preferably comprising a single coiled compression spring 20 of helical type.

Front shock absorbers are indicated at 21 and rear shock absorbers at 22, it being the function of shock absorbers 21 and 22 to dampen the vertical movement of the axles relative to the frame or body, the forward shock absorbers in reality being combined with the front end suspension means and the rear shock absorbers 22 being connected to the rear axle 16 by any suitable systems of levers and links. Both sets of shock absorbers are of the two-way hydraulic type. Front and rear transversely disposed torsion rods are indicated at 25 and 26 respectively, these rods being rotatably supported upon the frame and being either continuous from side to side, as shown, or provided with flexible couplings intermediate their ends. The ends of the forward torsion rod 25, outside of the side frame members 11, are rearwardly turned and the extremities of these rearwardly turned portions, which constitute crank arms, are connected, respectively, to the forward ends of the torque arms 18 by means of links 27 so that the torsion rod 25 will revolve in its bearings in the frame as the vehicle body rises and falls, and will be torsionally stressed when the body sways laterally, thus tending to maintain the body in a generally level position. As so far described, therefore, the torsion rod 25, due to its connection with both front wheel suspension mechanisms, will have the effect of a sidesway stabilizer, functioning in a known manner.

At a point intermediate the side frame members 11 the torsion rod 25 passes through an oscillation damping means 30, also rigidly secured to the frame as by being bolted to the forward cross member 14 thereof. The details of this device are most clearly illustrated in Figures 3, 4 and 5. It comprises essentially a casing 31 formed in several parts for convenience in manufacture and secured to the cross frame member 14 by bolts 32. It is of the hydraulic type and includes a double ended piston 33 slidable in a cylinder 34 the axis of which extends longitudinally of the frame, the piston 33 having a recess 35 formed therein for the reception of a piston operating arm 36 mounted rigidly upon the torsion rod 25. Rotation of rod 25 obviously results in reciprocation of the piston 33 within cylinder 34. The ends of the cylinders 34 are connected by two passages or bypass ducts, one of which is indicated at 38 and is shown to be in communication with the right-hand end of the cylinder (Figure 3), through a relatively restricted port 39 and with the left-hand end of the cylinder through a similar port 40. Ports 39 and 40 are always open so that fluid may pass from one end of the cylinder 34 to the other thus permitting movement of the piston 33 under all circumstances, but these ports are so restricted in area that the fluid is by-passed through duct 38 with difficulty, thus greatly retarding the piston movement and the rotation of the torsion rod 25.

The second by-pass connecting the opposite ends of cylinder 24 comprises duct 41 having rather free communication with the right-hand end of cylinder 34 through the short vertical branch 41', the duct 41 also having a branch 41$^2$ passing upwardly around the left-hand end of cylinder 34 and communicating with the interior of a hollow tubular guide member 44 the lower end of which is rigidly mounted in a recess formed in the casing 31. One or more ports 45 formed in the wall of tube 44 are normally in communication with the interior of the chamber 46 within which the tube 44 is located. Chamber 46 in turn communicates with the left-hand end of the cylinder 34 through duct 47 so that there is, under normal conditions, a continuous open passage from one end of cylinder 34 to the other through the chamber 46 and the piston 33 may reciprocate freely and without offering substantial resistance to rotation of the rod 25 or torsional displacement of either end thereof.

Slidably mounted upon guide tube 44 is a cylindrical block 50, hereinafter designated an inertia member, this block being cylindrically apertured to receive tube 44 with a close sliding fit. The inertia member 50 is normally supported in the position in which it is shown in Figure 3 by means of helical springs 51 and 52, one below and one above member 50, in which position an annular groove 53 formed in member 50 is in register with the ports 45 in the tube 44. Annular groove 53 is in constant communication with the interior of chamber 46, radially extending ducts 54 being provided for this purpose.

It is apparent that the inertia member 50 functions as a valve or closure for the ports 45 in tube 44 since any movement thereof, either upwardly or downwardly from its normal position as shown in Figure 3, will result in closure or partial closure of these ports. Hence the passage of fluid through the second by-pass 41 is permitted only when the inertia member is in the position shown, and is wholly or partially interrupted when the inertia member is either above or below this position.

When the vehicle is proceeding along a smooth roadway the inertia member 50 will be retained in the position shown by the springs 51 and 52, which springs are of such stiffness as to cause the weight 50 to remain in its neutral position despite minor and relatively slow vertical oscillations of the front end of the vehicle frame. Consequently the damping means 30 is substantially ineffective. Should the vehicle frame front end, however, either rise or fall vertically rather suddenly, the ports 45 will be wholly or partially closed due to the fact that the inertia member 50 will tend to remain in the position which is occupied before such movement occurred. The effect of this is to immediately increase the resistance to movement by the piston 33 which in turn offers increased resistance to rotation of torsion rod 25 and hence the tendency to vertical oscillation or movement of the frame is damped or retarded, the rod 25 being connected to the individual front end suspension means, as previously described. The inertia member will maintain port 45 closed only so long as the movement of the body in a vertical direction continues, the springs returning the member 50 to the position shown as soon as such movement ceases.

A second torsion rod oscillation damping device 56 may be rigidly secured to the rear cross frame member 12 and operatively connected to the torsion rod 26. This device may be similar in all respects to that just described in detail, and functions in a similar manner to retard the oscillations of the associated torsion rod. The vehicle is thus provided at both ends with means to retard and substantially eliminate vertical bouncing of the body upon the unsprung portion of the vehicle and by the cooperation of these instrumentalities greatly increased riding comfort may be realized. The invention, however, contemplates the use of one only of the vertical oscillation damping devices if desired, located at one end of the vehicle, and it is obvious that such devices may be connected to the wheels or axles by means other than the torsion rods illustrated herein.

In the event that the inertia member 50 tends to move too freely axially of tube 44, means in addition to springs 51 and 52 may be provided for damping or opposing such movement. Thus, within an annular groove 60 formed in the cylindrical surface of member 50 is positioned a ring 61 which projects into the annular space intermediate member 50 and the cylindrical wall of the chamber 46 within which the inertia member is housed. The ring 61 thus partially obstructs the flow of fluid from one end of chamber 46 to the other, around member 50, and the movements of this member are thereby damped. By varying the diameter of ring 61 this annular clearance space for oil may be varied, or a valve controlled by-pass for fluid made use of.

Having thus described the invention, what is claimed as new and desired to be secured by Letters Patent is:

1. In a motor vehicle, the combination with a vehicle frame, of oppositely disposed road wheels associated with said frame, means yieldingly supporting said frame on said road wheels for rising and falling movement with respect thereto, means resisting rapid relative movements of said frame and road wheels irrespective of absolute vertical movement of said frame, and means responsive to absolute vertical movement of said frame and acting between said road wheels and frame to resist rapid relative movement thereof.

2. In a motor vehicle the combination with a vehicle frame, of oppositely disposed road wheels associated with said frame, means yieldingly supporting said frame on said road wheels for rising and falling movement with respect thereto, means resisting rapid relative movements of said frame and road wheels irrespective of absolute vertical movement of said frame, said last named means comprising a shock absorber acting between each of said wheels and said frame, and means responsive to absolute vertical movement of said frame and acting between said road wheels and frame to resist rapid relative movement thereof.

3. In a motor vehicle, the combination with a vehicle frame, of oppositely disposed road wheels associated with said frame, means yieldingly supporting said frame on said road wheels for rising and falling movement with respect thereto, means resisting rapid relative movements of said frame and road wheels irrespective of absolute vertical movement of said frame, and means rendered effective in increased degree by absolute vertical movement of said frame for resisting rapid relative movements of said road wheels and frame.

4. In a motor vehicle, the combination with a vehicle frame, of oppositely disposed road wheels associated with said frame, means yieldingly supporting said frame on said road wheels for rising and falling movement with respect thereto, means resisting rapid relative movements of said frame and road wheels irrespective of absolute vertical movement of said frame, said last named means comprising a shock absorber acting between each of said wheels and said frame, and a shock absorber acting between both of said wheels and said frame and effective in increased degree on occurrence of absolute vertical movement of said frame for resisting relative movement of said road wheels and frame.

5. In a motor vehicle, the combination with a vehicle frame, of oppositely disposed road wheels associated with said frame, means yieldingly supporting said frame on said road wheels for rising and falling movement with respect thereto, means associated with said wheels and said frame for yieldingly resisting frame sidesway, and a device responsive to absolute vertical movement only of said frame and acting between said last named means and said frame for resisting rapid relative movement of said wheels and said frame.

6. In a motor vehicle, the combination with a vehicle frame, of oppositely disposed road wheels associated with said frame, means yieldingly supporting said frame on said road wheels for rising and falling movement with respect thereto, torque transmitting means acting between said wheels and frame to resist frame sidesway, and an inertia controlled shock absorber acting between said frame and said torque transmitting means on occurrence of absolute vertical displacement only of said frame to resist rapid relative movement of said frame and wheels.

7. In a motor vehicle, the combination with a vehicle frame, of oppositely disposed road wheels associated with said frame, means yieldingly supporting said frame on said road wheels for rising and falling movement with respect thereto, torque transmitting means acting between said wheels and frame to resist frame sidesway, an inertia controlled shock absorber acting between said frame and said torque transmitting means on occurrence of absolute vertical displacement of said frame to resist rapid relative movement of said frame and wheels, and shock absorbing means acting independently of absolute vertical displacement of said frame for resisting rapid relative movement of said frame and wheels.

8. In a motor vehicle having a frame and oppositely disposed road wheels, the combination with means yieldingly supporting said frame on said wheels for rising and falling movement with respect thereto, of a shock absorber acting between said frame and each of said wheels for resisting rapid relative movement thereof independently of absolute movement of either, and means affording increased resistance to such relative movement on occurrence of absolute vertical movement of said frame.

9. In a motor vehicle having a frame and oppositely disposed road wheels, the combination with means yieldingly supporting said frame on said wheels for rising and falling movement with respect thereto, of a shock absorber acting between said frame and each of said wheels for resisting rapid relative movement thereof independently of absolute movement of either, a torque rod supported for rotation on said frame and acting between said wheels to resist frame sidesway, and a shock absorbing means carried centrally of said frame and connected to said torque rod to yieldingly resist rotation of the latter.

10. In a motor vehicle having a frame and oppositely disposed road wheels, the combination with means yieldingly supporting said frame on said wheels for rising and falling movement with respect thereto, of a shock absorber acting between said frame and each of said wheels for resisting rapid relative movement thereof independently of absolute movement of either, of a torque rod supported for rotation on said frame and acting between said wheels to resist frame sidesway, and a shock absorbing means carried centrally of said frame and connected to said torque rod to yieldingly resist rotation of the latter, said centrally disposed shock absorbing means including a device responsive to absolute vertical movement of said frame for increasing the resistance to torque rod rotation offered thereby.

11. In a motor vehicle having a frame and oppositely disposed road wheels, the combination with means yieldingly supporting said frame on said wheels for rising and falling movement with respect thereto, of a shock absorber acting between said frame and said wheels for resisting rapid relative movement thereof, said shock absorber being disposed centrally of said frame, and means associated with said shock absorber and operable in response to absolute vertical movement of said frame for increasing the effective resistance offered by said shock absorber.

12. In a motor vehicle having a frame and oppositely disposed road wheels, the combination with means yieldingly supporting said frame on said wheels for rising and falling movement with respect thereto, of shock absorbing means acting between said frame and said wheels for resisting rapid relative movement thereof, and means connected with said shock absorbing means and associated with the central portion of the frame and operable in response to vertical movement of said central portion of the frame for increasing the effective resistance offered by said shock absorbing means.

13. In a motor vehicle, the combination with a vehicle frame, of oppositely disposed road wheels associated with said frame, means yieldingly supporting said frame on said road wheels for rising and falling movement with respect thereto, torque transmitting means acting between said wheels and frame to resist frame sidesway, inertia controlled shock absorbing means acting between said frame and said torque transmitting means on occurrence of absolute vertical displacement of said frame to resist rapid relative movement of said frame and wheels, said last named means comprising an inertia controlled shock absorber disposed centrally of said vehicle frame, and shock absorbing means acting independently of absolute vertical displacement of said frame for resisting rapid relative movement of said frame and wheels.

CLYDE R. PATON.